(12) United States Patent
Nanjundaswamy

(10) Patent No.: US 8,897,423 B2
(45) Date of Patent: Nov. 25, 2014

(54) CALLING PARTY'S LANGUAGE SELECTION BASED ON CALLED PARTY'S PHONE NUMBER

(75) Inventor: Vijay Nanjundaswamy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 2109 days.

(21) Appl. No.: 11/888,432

(22) Filed: Jul. 31, 2007

(65) Prior Publication Data

US 2008/0298559 A1 Dec. 4, 2008

(30) Foreign Application Priority Data

Jun. 1, 2007 (IN) .......................... 1177/DEL/2007

(51) Int. Cl.
*H04M 1/64* (2006.01)
*H04M 1/725* (2006.01)
*H04M 3/493* (2006.01)
*H04M 3/42* (2006.01)

(52) U.S. Cl.
CPC ........ *H04M 1/72572* (2013.01); *H04M 3/4936* (2013.01); *H04M 3/42059* (2013.01); *H04M 3/42102* (2013.01); *H04M 2203/2061* (2013.01); *H04M 2242/15* (2013.01); *H04M 2250/22* (2013.01); *H04M 2250/58* (2013.01)
USPC ........ 379/88.06; 379/76; 379/88.17; 715/703

(58) Field of Classification Search
USPC ........... 379/67.1, 88.05, 88.06, 72, 76, 88.17, 379/88.18, 167.08, 221.09, 263, 142.15; 715/703
See application file for complete search history.

(56) References Cited

U.S. PATENT DOCUMENTS

| | | | |
|---|---|---|---|
| 6,069,939 A | 5/2000 | Fung et al. | |
| 6,240,170 B1 * | 5/2001 | Shaffer et al. | 379/142.15 |
| 6,707,901 B1 * | 3/2004 | Hodges et al. | 379/221.09 |
| 7,698,642 B1 * | 4/2010 | Sarin | 715/703 |

* cited by examiner

*Primary Examiner* — Md S Elahee

(57) ABSTRACT

In one embodiment, a method includes identifying a geographic location of a called party based on a phone number of the called party, entered by a calling party, and prompting the calling party with at least one spoken language based on the geographic location of the called party.

14 Claims, 8 Drawing Sheets

| ANI 800 | COUNTRY CODE 802 | COUNTRY 804 | CITY / REGION CODE 806 | CITY / REGION 808 | PHONE NUMBER 810 | SELECTED LANGUAGE 812 |
|---|---|---|---|---|---|---|
| 374 286 853 | • • | • • | • • | • • | • • | • • |
| | 86 | CHINA | 28 | CHENGDU | 345-6789 | MANDARIN |
| | 86 | CHINA | 20 | GUANGZHOU | 888-0011 | CANTONESE |
| 264 351 792 | • • | • • | • • | • • | • • | • • |
| | 33 | FRANCE | — | — | 426-558-1186 | ENGLISH |
| 532 811 031 | • • | • • | • • | • • | • • | • • |
| | 49 | GERMANY | — | — | 925-764-8351 | GERMAN |
| | 32 | BELGIUM | — | — | 461-326-1438 | GERMAN |
| • • • | • • • | • • • | • • • | • • • | • • • | • • • |

| COUNTRY CODE 700 | COUNTRY 702 | CITY / REGION CODE 704 | CITY / REGION 706 | LANGUAGE(S) 708 |
|---|---|---|---|---|
| 54 | ARGENTINA | — | — | SPANISH, FRENCH, PORTUGUESE |
| • • | • • | • • | • • | • • |
| 55 | BRAZIL | — | — | PORTUGUESE |
| • • | • • | • • | • • | • • |
| 86 | CHINA | 28 | CHENGDU | SHANGHAINESE, MANDARIN |
| 86 | CHINA | 20 | GUANGZHOU | CANTONESE |
| • • | • • | • • | • • | • • |
| 33 | FRANCE | — | — | FRENCH |
| • • | • • | • • | • • | • • |
| 91 | INDIA | 755 | BHOPAL | ACCENT ENGLISH |
| • • • | • • • | • • • | • • • | • • • |

FIGURE 7

| ANI 800 | COUNTRY CODE 802 | COUNTRY 804 | CITY / REGION CODE 806 | CITY / REGION 808 | PHONE NUMBER 810 | SELECTED LANGUAGE 812 |
|---|---|---|---|---|---|---|
| 374 286 853 | • • | • • | • • | • • | • • | • • |
| | 86 | CHINA | 28 | CHENGDU | 345-6789 | MANDARIN |
| 264 351 792 | 86 | CHINA | 20 | GUANGZHOU | 888-0011 | CANTONESE |
| | • • | • • | • • | • • | • • | • • |
| | 33 | FRANCE | — | — | 426-558-1186 | ENGLISH |
| 532 811 031 | • • | • • | • • | • • | • • | • • |
| | 49 | GERMANY | — | — | 925-764-8351 | GERMAN |
| | 32 | BELGIUM | — | — | 461-326-1438 | GERMAN |
| • • • | • • • | • • • | • • • | • • • | • • • | • • • |

CALLING PARTY'S LANGUAGE SELECTION BASED ON CALLED PARTY'S PHONE NUMBER

CLAIM OF PRIORITY

This application claims priority from the Patent Application filed in India having Serial No. 1177/DEL/2007 titled "Calling Party's Language Selection Based on Called Party's Phone Number" filed on Jun. 1, 2007.

FIELD OF TECHNOLOGY

The present disclosure relates generally to the technical fields of software and/or hardware in communication.

BACKGROUND

An international phone call may be placed between a calling party in one geographic location (e.g., France, Spain, Japan, etc.) and a called party in another geographic location (e.g., China, United States, Argentina, etc.). The calling party and the called party may receive audio prompts and/or announcements. The audio prompts may be provided in a language spoken in the calling party's geographic location (e.g., the calling party in the United States may be prompted in English). An international phone service may provide the called party with the audio prompts in a selected language based on the geographic location of the called party (e.g. U.S. Pat. No. 6,069,939, Country-Based Language Selection).

As for the calling party, he or she may be staying in a country where he/she does not speak a native language (e.g., which may be commonly spoken by people residing in the country) of the country. In case the calling party places the international call (e.g., a Chinese-speaking woman in the United States calling home in China), the calling party may not understand audio prompts in English. In addition, the calling party may be more comfortable communicating in the calling party's native tongue.

In order for the calling party to speak in a language of the calling party's choice, the calling party may have to go through several steps. For example, the calling party may have to call an operator of the international phone service to request to be prompted in the language of the calling party's choice. Or, the calling party may have to call a toll free number of the international phone service to manually select the language of the calling party's choice (e.g., thus requiring more time and efforts from the calling party).

OVERVIEW

In one embodiment, a method includes identifying a geographic location of a called party based on a phone number of the called party, entered by a calling party, and prompting the calling party with one or more spoken languages based on the geographic location of the called party.

In another embodiment, an apparatus includes a geographic location module (e.g., which may process a country code, a region code, a city code, and/or an area code of the phone number of the called party to determine the geographic location of the called party) to determine a geographic location of a called party based on a phone number of the called party, a language module to determine one or more spoken languages based on the geographic location of the called party, and a selection module to enable a calling party to select a selected language from the one or more spoken languages.

In yet another embodiment, a method includes prompting a calling party to choose a selected language among one or more spoken languages based on a phone number of a called party and one or more default languages, tagging the selected language to the phone number of the called party, and prompting a calling party in the selected language when the phone number of the called party is entered by the calling party.

BRIEF DESCRIPTION OF EXAMPLE EMBODIMENTS

Example embodiments are illustrated by way of example and not limitation in the figures of the accompanying drawings, in which like references indicate similar elements and in which:

FIG. 3 illustrates an example flow chart of enabling the calling party to choose and save a language to continue prompts in.

FIG. 7 illustrates an example table view of possible languages based on a dialed phone number.

FIG. 8 illustrates an example table view of a selected language corresponding to an automatic number identification and the phone number.

Other features of the present embodiments will be apparent from the accompanying drawings and from the detailed description that follows.

DESCRIPTION OF EXAMPLE EMBODIMENTS

A method and apparatus of calling party's language selection based on called party's phone number are disclosed. In the following description, for the purposes of explanation, numerous specific details are set forth in order to provide a thorough understanding of the various embodiments. It will be evident, however to one skilled in the art that the various embodiments may be practiced without these specific details.

Figure 2:
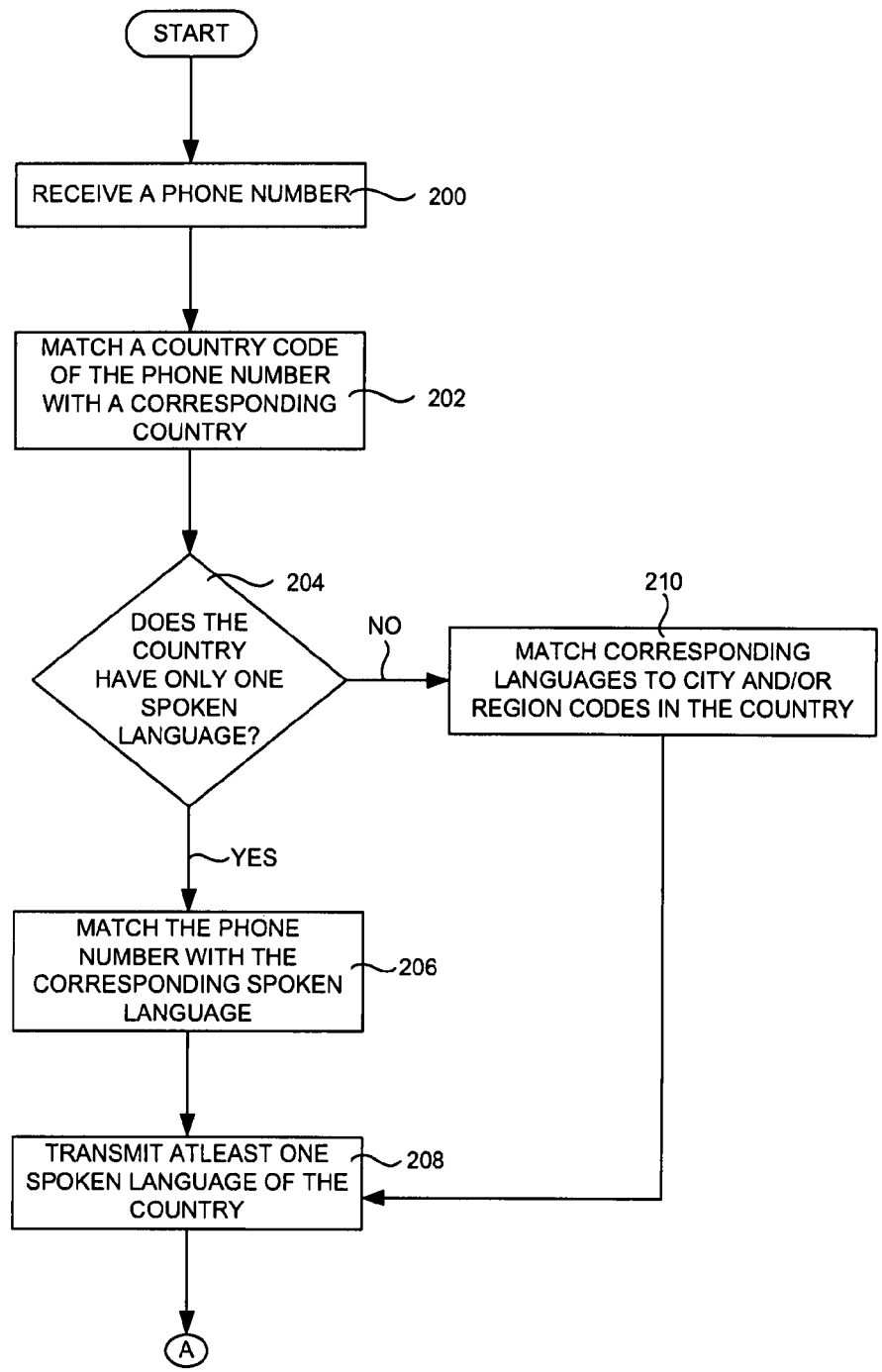
FIG. 2 illustrates an example flow chart of determining a spoken language based on a phone number.
Figure 3:
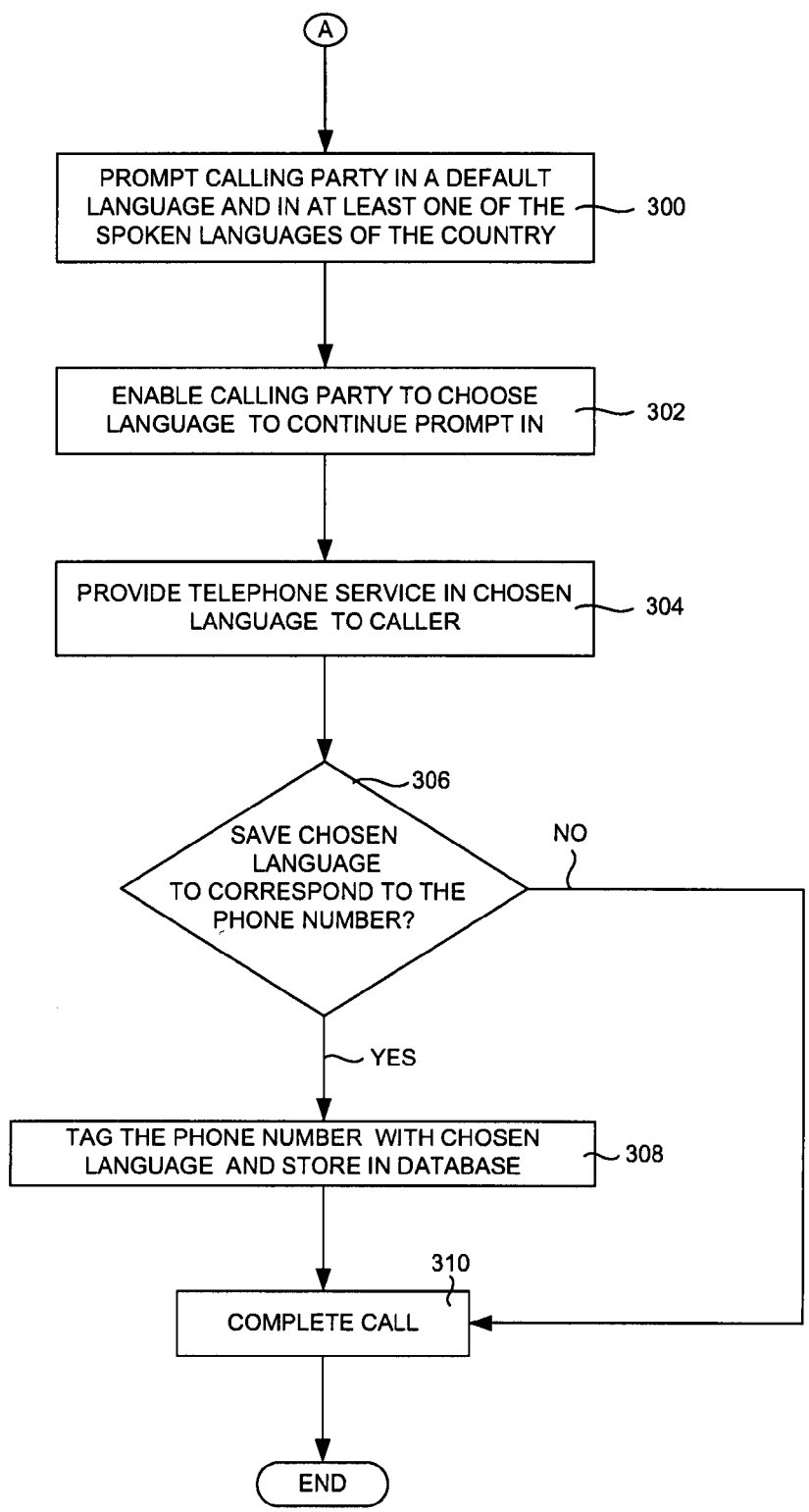
Figure 4:
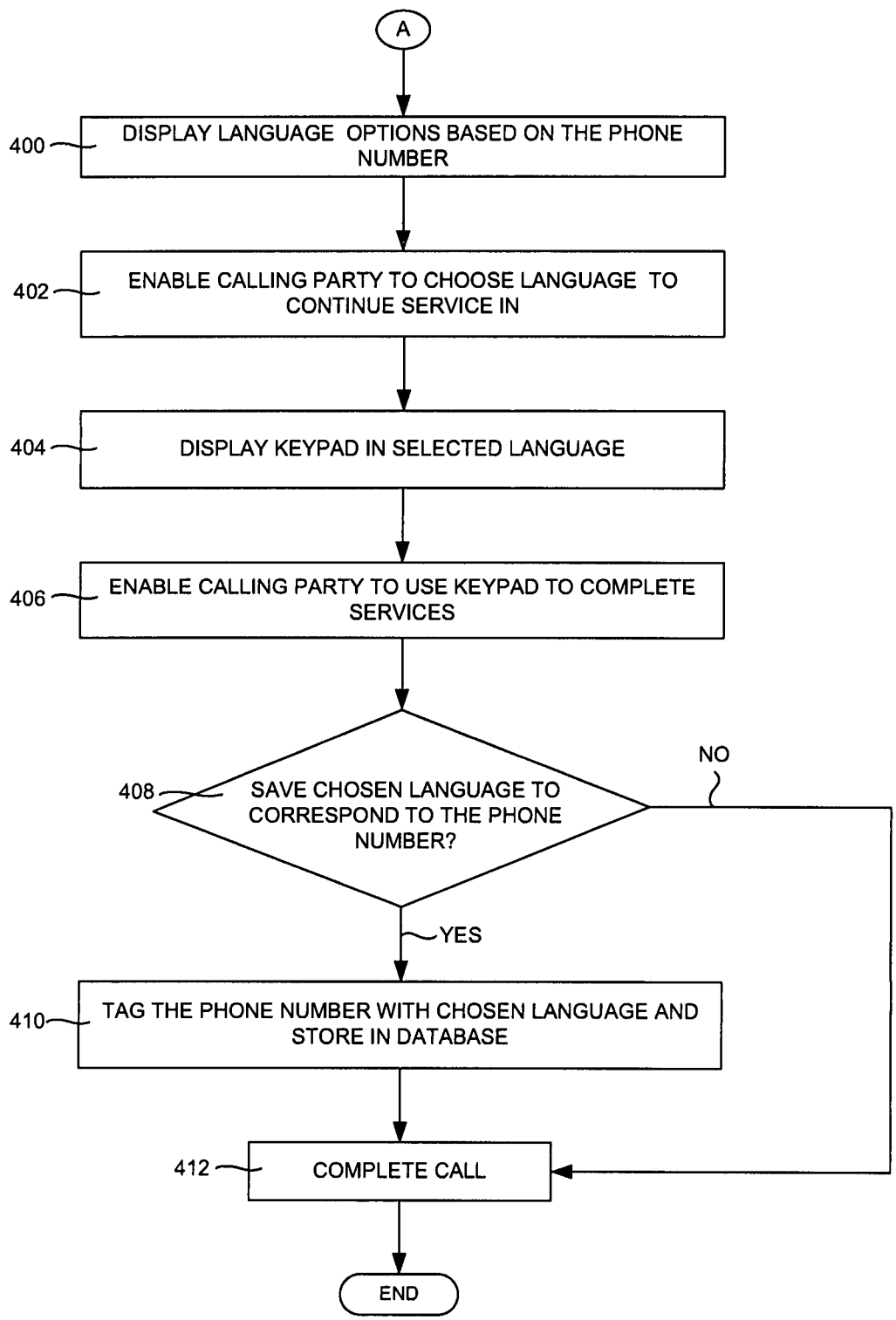
FIG. 4 illustrates an example flow chart of enabling the calling party to choose and save the language through a graphical user interface.

In one embodiment, a method includes identifying a geographic location of a called party based on a phone number of the called party, entered by a calling party, and prompting the calling party with one or more spoken languages based on the geographic location of the called party (e.g., as illustrated in FIGS. 2, 3 and 4).

In another embodiment, an apparatus includes a geographic location module (e.g., a geographic location module 108 of FIG. 1) to determine a geographic location of a called party (e.g., a called party 116) based on a phone number of the called party, a language module (e.g., a language module 110) to determine one or more spoken languages based on the geographic location of the called party, and a selection module (e.g., a selection module 112) to enable a calling party (e.g., a calling party 102) to select a selected language from the one or more spoken languages.

In yet another embodiment, a method includes prompting a calling party to choose a selected language among one or more spoken languages based on a phone number of a called party and one or more default languages, tagging the selected language to the phone number of the called party, and prompting a calling party in the selected language when the phone number of the called party is entered by the calling party (e.g., as illustrated in FIGS. 2, 3, and 4).

Figure 1:
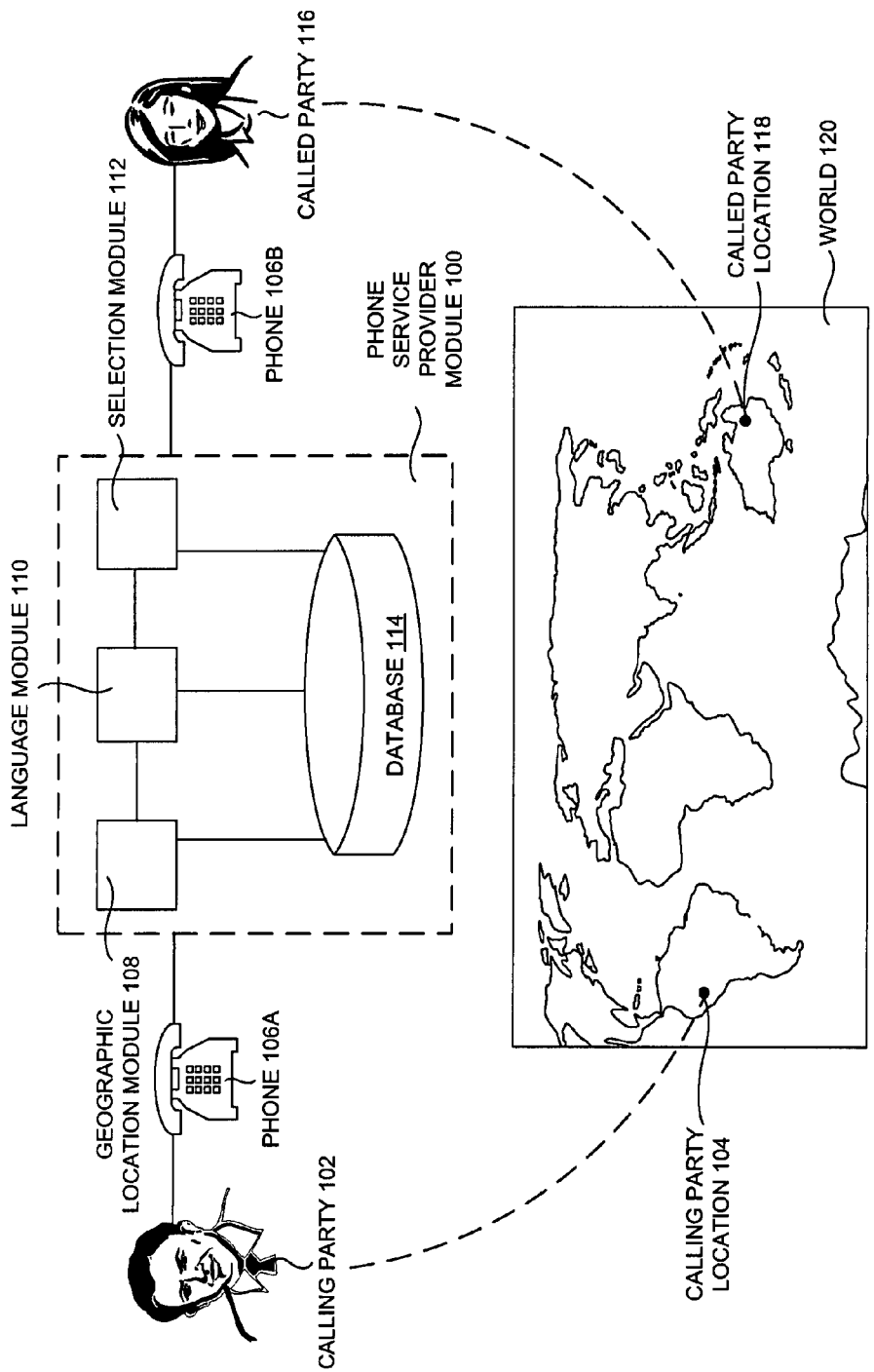
FIG. 1 illustrates an example block diagram of a calling party and a called party communicating with a phone service provider module.

FIG. 1 illustrates an example system view of a block diagram, of a calling party and a called party communicating with a phone service provider module. In particular, FIG. 1 illustrates a phone service provider module 100, a calling party 102, a calling party location 104, phones 106A-B, a geographic location module 108, a language module 110, a selection module 112, a database 114, a called party 116, a called party location 118, and a world 120, according to one embodiment.

The phone service provider module 100 may include the geographic location module 108, the language module 110, the selection module 112, and/or the database 114. The phone service provider module 100 may facilitate an international call being placed from the calling party location 104, which may be in a different country than the called party location 118. In one example embodiment, the phone service provider module 100 may provide prompts and/or announcements to the calling party 102 and/or the called party 116.

The phone service provider module 100 may process a phone number, entered by the calling party 102 and determine the geographic location (e.g., a country, a region, a city, a county, a province, etc.) of the called party 116. The calling party 102 may be prompted in a default language, which may be dependant of a geographic location of the calling party 102. However, the calling party 102 may not be fluent or comfortable in the default language (e.g., a man who can speak only Spanish is stopped at an international airport in Japan may not understand Japanese) based on the calling party location 104. The phone service provider module 100 may determine one or more spoken languages based on the called party location 118 by processing the phone number of the called party 116, entered by the calling party 102. The phone service provider module 100 may then allow the calling party to choose a selected language to be prompted in.

The calling party 102 may be located in the calling party location 104 (e.g., Argentina, Peru, United States, etc.) and using the phone 106A to call the called party 116, who may be located in the called party location 118 (e.g., Australia, China, India, etc.). When the calling party 102 places an international call to the called party 116, the calling party 102 may receive prompts and/or announcements (e.g., entering a calling card code, telling the calling party 102 that the called party 116 is unavailable, telling the calling party 102 that the network is busy, querying the calling party 102 to try again or to call again later, etc.) before the call is completed. The prompts may be provided by the phone service provider module 100 (e.g., a world-wide telephone network).

The geographic location module 108 may process the phone number of the called party 116, entered by the calling party 102 and may determine the geographic location of the one or more of the calling party 102 and the called party 116. This process may be best understood with further reference to FIG. 2.

The language module 110 may interact with the database 114 to determine the one or more spoken languages (e.g., a national language, a regional language, a local language, a dialect, etc.) in one or more of the called party location 118. The language module 110 may determine the default language spoken in the calling party location 104. The default language may be the language that the calling party 102 is normally prompted in when placing a call from the calling party location (e.g., a man in the United States calling a man in China may be prompted in English, the default spoken language in the United States).

The selection module 112 may allow the calling party 102 to choose a language of the prompts and/or announcements in, according to one embodiment. The selection module 112 may prompt the calling party 102 with prompts in one or more spoken languages determined by the language module 110. The database 114 may contain information used by the phone service provider module 100 in facilitating the international call. Its contents can be best understood with further reference to FIG. 7 and FIG. 8.

FIG. 2 illustrates an example flow chart of determining the spoken language based on the phone number. In operation 200, the phone service provider module 100 may receive the phone number of the called party 116, entered by the calling party 102. The phone number may consist of a country code, a city code, a region code, and/or an area code. In operation 202, the phone service provider module 100 may match the country code of the phone number with a corresponding country (e.g., country code 86 corresponds to China).

If the country has only one spoken language in operation 204, then operation 206 may match the phone number with a corresponding spoken language of the country (e.g., Brazil may only have one spoken language which may be Portuguese). If the country does not have only one spoken language in operation 204, then operation 210 may match a corresponding language to a city code, a region code, and/or an area code in the country based on the phone number (e.g., Argentina may have more than one spoken language and Spanish, French, and/or Portuguese may be matched with the corresponding phone number). Operation 208 may transmit the one or more spoken languages of the country.

FIG. 3 illustrates an example flow chart of enabling the calling party to choose and save the language to continue prompts in. In particular, FIG. 3 may continue after the operation 208 of FIG. 2, which may transmit one or more spoken languages of the country.

In FIG. 3, operation 300 may prompt the calling party 102 in the default language and in the one or more spoken languages of the country. (e.g., a calling party in the United States calling a relative in Argentina may be prompted to continue in English, the default language of the United States, or Spanish, French, and/or Portuguese, the spoken languages of the country corresponding to the phone number of the called party).

Operation 302 may enable the calling party 102 to choose a language to continue prompt in. The calling party 102 may interact with the phone service provider module 100 through an interactive voice response (e.g., the calling party may say a word in any one of the languages which may signal the selection of that particular language) or may select by entering a number on the phone 106A (e.g., press 1 for English, press 2 for Spanish, press 3 for French, etc.).

Operation 304 may provide telephone service (e.g., prompts, announcements, live help, etc.) in the chosen language to the calling party 102. Before completing the call, the calling party 102 may have to input more information (e.g., calling card pin, caller identification, etc.) or may receive a message from the telephone service provider (e.g., the called party 116 has a busy line, the network is busy, the called party 116 has his/her phone turned off, etc.). Operation 304 may provide these services in the chosen language by the called party 116.

Operation 306 may query the calling party 102 to save the chosen language to correspond to the phone number of the called party 116. The call may be completed in operation 310, if the calling party chooses not to save the chosen language.

Operation 308 may tag the phone number with the chosen language and store in the database 114 if the calling party chooses to. This may allow the calling party 102 to be automatically prompted in the saved chosen language rather than the default language corresponding to the calling party location 104.

For example, a Chinese man in the United States may not speak English well and may frequently call his family living in China. The man may save his chosen language (e.g., Mandarin) in the database 114 which corresponds to the phone number of his home in China. The next time the man dials to his home in China, he may be prompted in Mandarin, the saved chosen language, rather than the default language, English, in the United States. Operation 310 may complete the call, following the conclusion of the prompts provided by the phone service provider module 100.

FIG. 4 illustrates an example flow chart of enabling the calling party to choose and save the language through a graphical user interface. In particular, FIG. 4 may continue after the operation 208 of FIG. 2, which may transmit the one or more spoken language of the country. In FIG. 4, the operation 400 may display the one or more spoken languages of the country through the graphical user interface (e.g., a smart phone, etc.). The display may include the one or more spoken languages corresponding to the phone number of the called party 116 and the default language corresponding to the calling party location 104.

Operation 402 may enable the calling party 102 to choose a language to continue the telephone service in (e.g., through a touch screen, a keypad, etc.). Operation 404 may display a keypad (e.g., a selected language based keypad 606 in FIG. 6) in the selected language. The keypad may be displayed on the graphical user interface and may contain characters in the spoken language. Operation 406 may enable the calling party 102 to use the keypad to complete phone services provided by the phone service provider module 100.

Operation 408 queries the calling party 102 to save the chosen language to correspond to the phone number of the called party 116. The call may be completed in operation 412, if the calling party 102 chooses not to save the chosen language. Operation 410 may tag the phone number with the chosen language and store in the database 114 if the calling party 102 chooses to. This may allow the calling party 102 to be automatically prompted in the saved chosen language rather than the default language corresponding to the calling party location 104.

For example, a Chinese man in the United States may not speak English well and may frequently call his family living in China. The man may save his chosen language (e.g., Mandarin) in the database 114 which may correspond to the phone number of his home in China. The next time the man dials to his home in China, he may be prompted in Mandarin, the saved chosen language, rather than the default language, English, in the United States. Operation 412 may complete the call, following the conclusion of the prompts provided by the phone service provider module 100.

Figure 5:
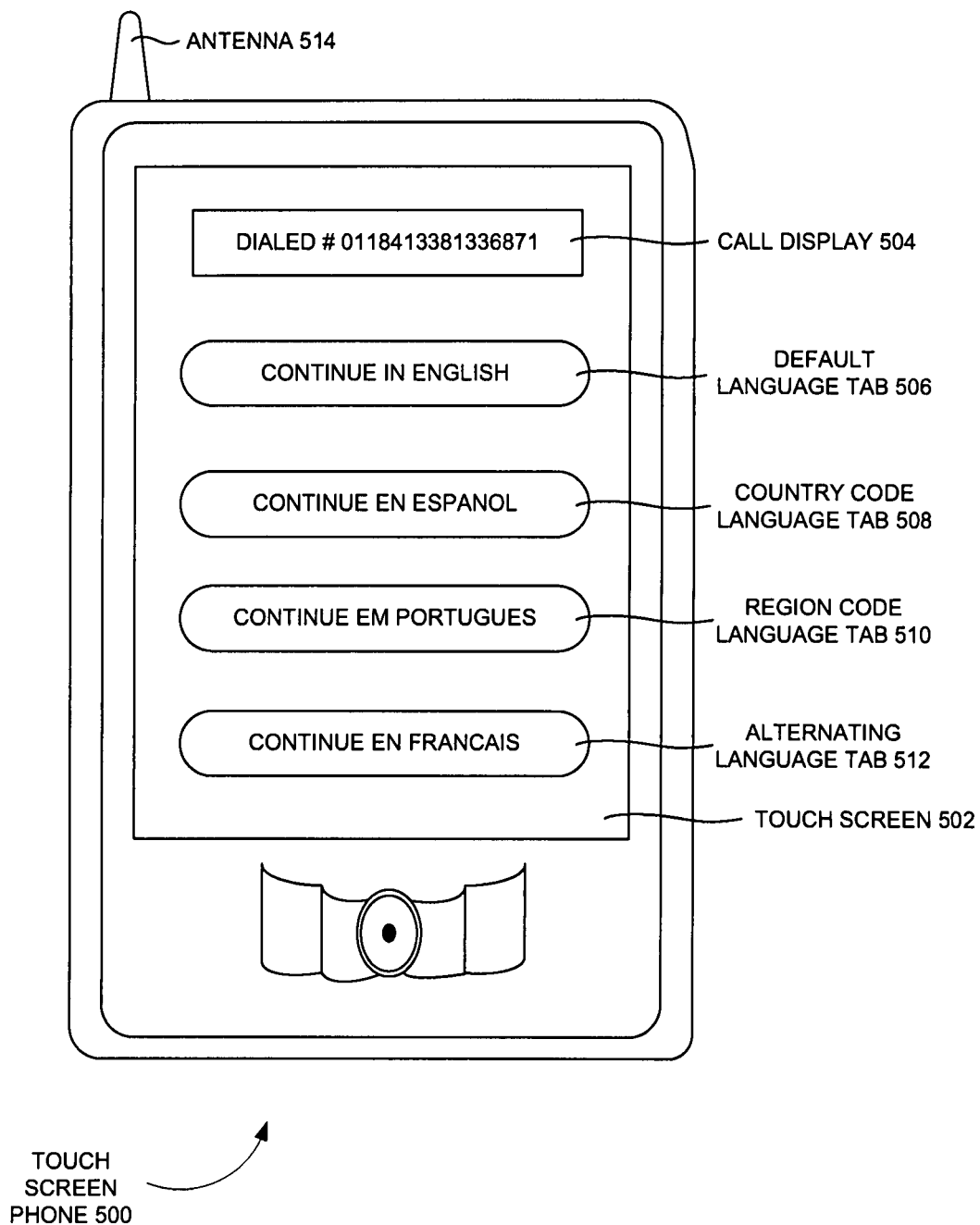
FIG. 5 illustrates an example user interface view of a touch screen phone.

FIG. 5 illustrates an example user interface view of a touch screen phone. In particular, FIG. 5 illustrates a touch screen phone 500, a touch screen 502, a call display 504, a default language tab 506, a country code language tab 508, a region code language tab 510, an alternating language tab 512, and an antenna 514, according to one embodiment.

The touch screen phone 500 (e.g., an iPhone, a PDA phone, etc.) may provide the calling party 102 with prompts and/or announcements before completion of the phone call made to the called party 116 by displaying through the graphical user interface, according to one embodiment. The touch screen 502 may facilitate the calling party 102 to enter selections (e.g., using a finger, a stylus, etc.) corresponding to the prompts and/or announcements associated with the phone call.

The call display 504 may display the dialed phone number of the called party 116, entered by the calling party 102. The default language tab 506 may display a tab prompting the calling party 102 to continue in the default language of the country corresponding to the calling party location (e.g., in English if the calling party location 104 is in the United States). The country code language tab 508 may display a tab prompting the calling party 102 to continue in the language corresponding to the country code of the phone number, determine through the operations of FIG. 2 (e.g., in Spanish, if the country code of the phone number entered by the calling party corresponds to Argentina).

The region code language tab 510 may display a tab prompting the calling party 102 to continue in the language corresponding to the region code of the phone number, determined through the operations of FIG. 2 (the spoken language in the region corresponding to the region code of the dialed phone number may be Portuguese). The alternating language tab 512 may display a tab prompting the calling party 102 to continue in an alternative language which may be spoken in the country (e.g., French). The antenna 514 may facilitate the touch screen phone by generating the proper signal to connect with the phone service provider module 100.

Figure 6:
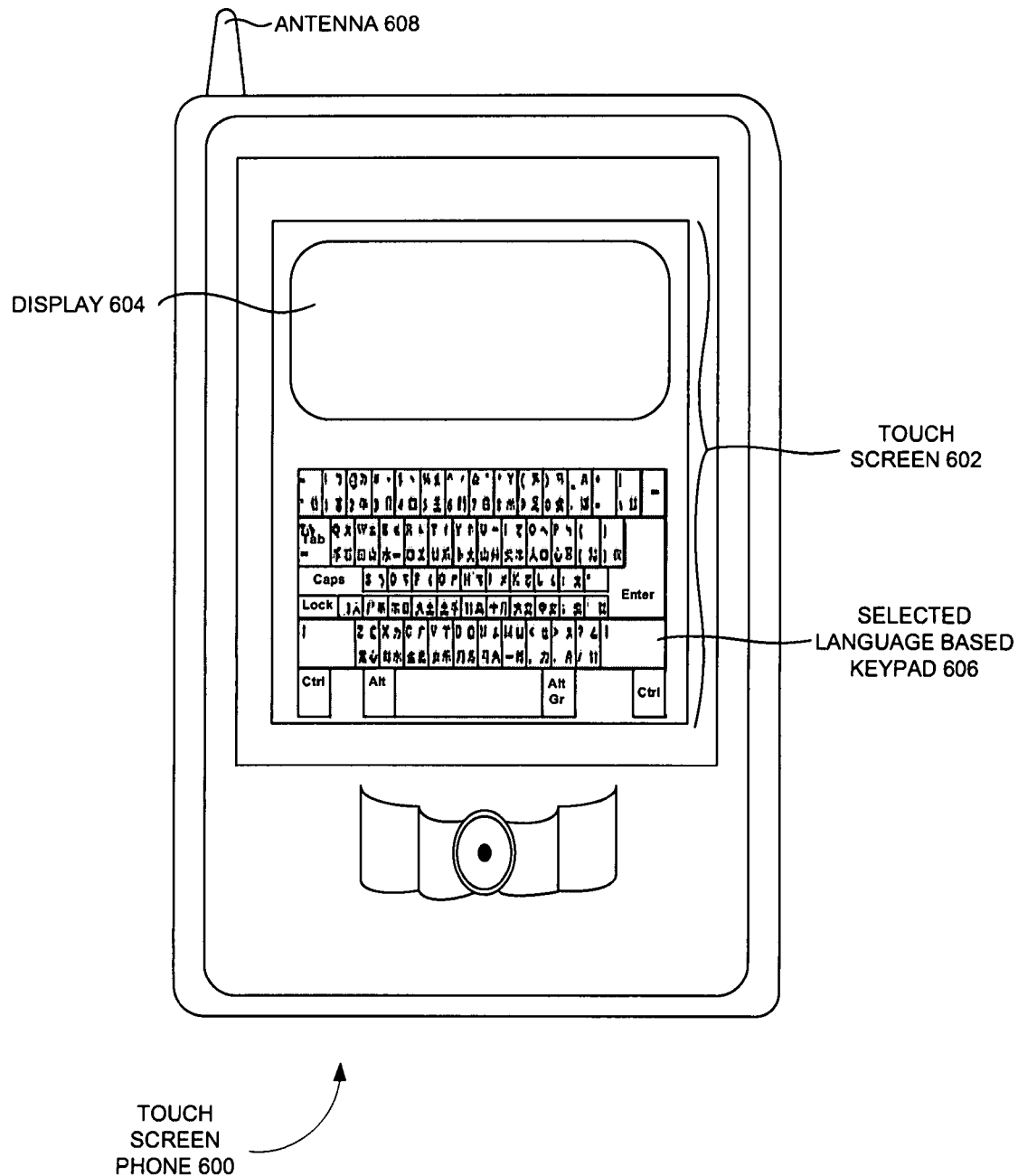
FIG. 6 illustrates an example user interface view of a touch screen phone.

FIG. 6 illustrates an example user interface view of touch screen phone. In particular, FIG. 6 illustrates a touch screen phone 600, a touch screen 602, a display 604, a selected language based keypad 606, and an antenna 608, according to one embodiment. The touch screen phone 600 may provide prompts and/or announcements to the calling party 102 in a chosen language, selected by the calling party. The touch screen 602 may facilitate the calling party 102 to enter selections (e.g., using a finger, a stylus, etc.) corresponding to the prompts and/or announcements associated with the phone call.

The display 604 may contain the prompts and/or announcements for the calling party 102 before the phone call may be completed. The display 604 may also output the inputs from the called party through the selected language based keypad 606. The language based keypad 606 may appear on the graphical user interface following the selection of the language to continue in. The language based keypad 606 may contain keys corresponding to letters and/or symbols corresponding to the chosen language.

The calling party 102 may use the keypad through the touch screen 602 (e.g., by pressing with a finger, a stylus, etc.). In FIG. 6, the touch screen phone may display a keypad corresponding to Chinese. The antenna 608 may facilitate the touch screen phone by generating the proper signal to connect with the phone service provider module 100.

FIG. 7 illustrates an example table view of possible languages based on a dialed phone number. In particular, FIG. 7 illustrates a table containing a country code 700 column, a country 702 column, a city/region code 704 column, a city/region 706 column, and a language(s) 708 column. The database 114 may contain the contents of FIG. 7 and communicate them with the geographic location module 108 and the language module 110 of FIG. 1.

In one example embodiment, a man located in Mexico, may place an international call to China. The man may be from China and may not speak the spoken language of his geographic location (e.g., Spanish in Mexico). When the man enters the phone number of his home in China, the country code 700 (e.g., country code 86 may correspond to China) of the phone number may indicate that the country 702 corresponding to the geographic location of the phone number entered is China.

The phone number may also contain the city/region code 704 which may correspond to a city/region 706 of the phone number (e.g., the city/region code 28 may correspond to Chengdu). The database 114 may contain one or more of the language(s) 708 which may correspond to the country code 700 and/or the city/region code 704. The language(s) 708 column may contain one or more spoken languages corresponding to the geographic location of the called party 114 based on the phone number entered by the calling party 104 of FIG. 1.

FIG. 8 illustrates an example table view of a selected language corresponding to an automatic number identification and a phone number. In particular, FIG. 8 illustrates an ANI 800 column, a country code 802 column, a country 804 column, a city/region code 806 column, a city/region 808 column, a phone number 810 column, and a selected language 812 column.

The ANI 800 column may store an automatic number identification which may correspond to the calling party 104 (e.g., the telephone number from which the calling party 102 is calling from). In another embodiment, the ANI may correspond to a calling card identification number, entered by the calling party 102. The country code 802 column may list the country code 802 which may correspond to the phone number dialed by the calling party 102. The country 804 column may connect the country code 802 with its corresponding country. The city/region code 806 column may list the city/region code 806 which may correspond to the phone number dialed by the calling party 102.

The city/region 808 column may connect the city/region code 806 with its corresponding city/region 808. The phone number 810 column may store the phone number of the called party 116, entered by the calling party 104. The selected language 812 column may store a selected language to continue prompts in for the calling party 104. The calling party 104 may be prompted to save the selected language to correspond to the entered phone number (e.g., a man from Korea may be calling his family from his business apartment in the United States, may select to continue prompts in Korean and then may save the language to become the default language when he places a call, recognized by his ANI to the phone number of his family in Korea).

Although the present embodiments have been described with reference to specific example embodiments, it will be evident that various modifications and changes may be made to these embodiments without departing from the broader spirit and scope of the various embodiments.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of making a call from a calling party to a called party, comprising:
   at a phone service provider apparatus, receiving from the calling party a phone number of the call of the called party;
   identifying a first geographic location of the calling party;
   determining a first default language associated with the first geographic location;
   identifying a second geographic location of the called party based on the phone number of the called party;
   determining a second default language associated with the second geographic location;
   selecting a first prompt language from one of the determined first default language and the second default language to provide prompts to the calling party;
   selecting a second prompt language from one of the determined first default language and the second default language to provide prompts to the calling party;
   prompting the calling party to select a calling party language comprising either the first prompt language or the second prompt language to convey messages to the calling party using the calling party language;
   prompting the called party to select a called party language comprising either the first prompt language or the second prompt language to convey messages to the called party using the called party language;
   storing the calling party language to a calling party user profile associated with the calling party for subsequent prompt language selection;
   storing the called party language to a called party user profile associated with the called party for subsequent prompt language selection; and
   retrieving data for the first prompt language for the calling party and data for the second prompt language for the called party during a subsequent call from the calling party to the called party.

2. The method of claim 1, wherein determining the second default language comprises determining the second default language based on the second geographic location determined by at least one of a country code, a city code, a region code and an area code of the phone number of the called party.

3. The method of claim 1, wherein prompting the calling party comprises prompting the calling party by communicating at least one of a first aural signal and a first visual signal, and wherein prompting the called party comprises prompting the called party by communicating at least one of a second aural signal and a second visual signal.

4. The method of claim 1, wherein determining the first default language comprises determining the first default language from at least one first spoken language comprising at least one of a first national language, a first regional language, a first local language and a first dialect associated with the first geographic location, and wherein determining the second default language comprises determining the second default language from at least one second spoken language comprising at least one of a second national language, a second region language, a second local language and a second dialect associated with the second geographic region.

5. The method of claim 4, wherein selecting the first prompt language comprises selecting the first prompt language to include the first spoken language based on a geographic location associated with a phone number of the calling party.

6. The method of claim 5, further comprising querying the calling party to speak to an operator speaking the second spoken language.

7. The method of claim 1, further comprising:
   generating a list including the first default language and the second default language; and
   rendering the list on a graphical user interface of a communication device used by the calling party.

8. The method of claim 7, further comprising enabling the calling party to choose a communication language in the list to communicate with the called party.

9. The method of claim 8, further comprising displaying a keypad corresponding to the communication language on the graphical user interface.

10. The method of claim 9, further comprising prompting the calling party with at least one instruction through the graphical user interface.

11. An apparatus, comprising:
a geographic location module configured to:
   receive from a calling party a phone number of a called party for making a call from the calling party to the called party; and
   identify a first geographic location of the calling party and a second geographic location of the called party based on the phone number of the called party;
a language module configured to determine a first default language associated with the first geographic location and a second default language associated with the second geographic location; and
a selection module configured to:
   select a first prompt language from one of the determined first default language and the second default language to provide prompts to the calling party;
   select a second prompt language from one of the determined first default language and the second default language to provide prompts to the calling party;
   prompt the calling party to select a calling party language comprising either the first prompt language or the second prompt language to convey messages to the calling party using the calling party language;
   prompt the called party to select a called party language comprising either the first prompt language or the second prompt language to convey messages to the called party using the called party language;
   store the calling party language to a calling party user profile associated with the calling party for subsequent prompt language selection;
   store the called party language to a called party user profile associated with the called party for subsequent prompt language selection; and
   retrieve data for the first prompt language for the calling party and data for the second prompt language for the called party during a subsequent call from the calling party to the called party.

12. The apparatus of claim 11, wherein the geographic location module is further configured to process at least one of a country code, a region code, a city code, and an area code of the phone number of the called party to identify the second geographic location of the called party.

13. The apparatus of claim 11, further comprising a language database configured to store the first default language, the second default language and the phone number of the called party associated with the second default language.

14. The apparatus of claim 12, further comprising a default language module of the selection module configured to generate a list of languages associated with the first geographic location, wherein the list of languages comprises at least a native language of the calling party, a dialect of the calling party, and a preferred language of the calling party.

* * * * *